United States Patent [19]

Patel

[11] Patent Number: 5,532,212
[45] Date of Patent: Jul. 2, 1996

[54] COMPOSITION COMPRISING A VISCOSITY PROMOTER AND A MAGNESIUM COMPOUND AND PROCESS USING THE COMPOSITION

[75] Inventor: Bharat B. Patel, Bartlesville, Okla.

[73] Assignee: Phillips Petroleum Company, Bartlesville, Okla.

[21] Appl. No.: 534,812

[22] Filed: Sep. 27, 1995

Related U.S. Application Data

[63] Continuation of Ser. No. 61,639, May 12, 1993, abandoned, which is a continuation-in-part of Ser. No. 34,966, Mar. 22, 1993, abandoned.

[51] Int. Cl.$^6$ ........................................................ C09K 7/02
[52] U.S. Cl. ............................................. 507/140; 507/145
[58] Field of Search ..................................... 507/140, 145, 507/905

[56] References Cited

U.S. PATENT DOCUMENTS

| | | | |
|---|---|---|---|
| 3,185,642 | 5/1965 | Sawyer et al. | 252/8.5 |
| 3,852,201 | 12/1974 | Jackson | 252/8.5 A |
| 3,855,147 | 12/1994 | Granquist | 507/140 |
| 4,240,924 | 12/1980 | Block | 507/140 |
| 4,257,903 | 3/1981 | Kucera et al. | 252/8.5 C |
| 4,405,468 | 9/1983 | Haun, Jr. | 252/8.5 B |
| 4,461,714 | 7/1984 | Burba | 252/184 |
| 4,582,614 | 4/1986 | House et al. | 252/8.5 A |
| 4,664,843 | 5/1987 | Burba et al. | 252/315.5 |
| 4,748,139 | 5/1988 | Burba, III | 507/120 |
| 5,196,143 | 3/1993 | Burba et al. | 252/315.5 |
| 5,232,627 | 4/1991 | Burba et al. | 252/315.5 |

FOREIGN PATENT DOCUMENTS

| | | |
|---|---|---|
| 2044317 | 10/1980 | United Kingdom . |
| 2097447 | 11/1982 | United Kingdom . |

OTHER PUBLICATIONS

Derwent WPI Abstract 85–011286, (1985).
Derwent WPI Abstract 85–120865, (1985).
Derwent WPI Abstract 87–077731, (1987).
Patent Abstract of Japan, vol. 13, No. 11 (C–597), (1989).

*Primary Examiner*—Philip Tucker
*Attorney, Agent, or Firm*—Lucas K. Shay

[57] ABSTRACT

A composition useful for viscosifying a water-based fluid is provided which comprises a metal aluminate such as sodium aluminate, or a blend of a viscosity promoter such as sodium aluminate and a magnesium compound such as magnesium oxide, or a clay such as bentonite and the blend. The water-based fluid can also contain a clay such as bentonite. A process for viscosifying a water-based fluid is also provided which comprises contacting the fluid with the composition described herein. Also disclosed is a process for controlling water loss of a water-based drilling fluid wherein the process comprises contacting the fluid with the composition described herein.

29 Claims, No Drawings

COMPOSITION COMPRISING A VISCOSITY PROMOTER AND A MAGNESIUM COMPOUND AND PROCESS USING THE COMPOSITION

This application is a Continuation of application Ser. No. 08/061,639, filed May 12, 1993 now abandoned, which is a Continuation-in-Part of application Ser. No. 08/034,966, filed Mar. 22, 1993 now abandoned.

The present invention relates to a composition useful for viscosifying a water-based fluid comprising a clay and a metal aluminate, or a blend of a viscosity promoter and a magnesium compound.

BACKGROUND OF THE INVENTION

Water-based fluids such as, for example, drilling fluids, milling fluids, mining fluids, water-based metal working fluids, food additives and water-based paints, are useful in a variety of industrial applications. It is well known to those skilled in the art of drilling wells to tap subterranean deposits of natural resources, such as gas, geothermal steam or oil, especially when drilling by the rotary method or the percussion method wherein cuttings must be removed from the bore hole, it is necessary to use a drilling fluid.

The use of water-based fluids in, for example, workover and completion fluids in oil field operations is also well known to those skilled in the art. Workover fluids are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc.

Completion fluids are those fluids used during drilling and during the steps of completion, or recompletion, of the well. Completion operation can include perforating the casing, setting the tubing and pump, etc. Both workover and completion fluids are used in part to control well pressure, to stop the well from blowing out while it is being completed or worked over, or to prevent the collapse of casing from over pressure.

Chemicals are added to the water-based fluids for various reasons that include, but are not limited to, increasing viscosity, reducing corrosion, and increasing the density of the fluids. For example, chemicals such as, for example, water-thickening polymers serve to increase the viscosity of the water-based fluids, when used as workover fluids or completion fluids, to retard the migration of the brines into the formation and to lift drilled solids from the wellbore.

However, the above-discussed chemicals are often unstable at the temperatures of various oil reservoirs and are often subject to biodegradation. An inorganic chemical such as, for example, magnesium oxide, is then used to increase the viscosity of the water-based fluids containing a clay. Unfortunately, a water-based fluid composition containing magnesium oxide requires mixing at a high shear for extended period or heating at an elevated temperature to develop a desirable viscosity for many industrial applications. It is therefore highly desirable to develop a composition for applications that require high viscosity development. It is also highly desirable to develop a composition which retains its proper viscosity over a broad range of conditions.

SUMMARY OF THE INVENTION

It is an object of the invention to provide a composition for viscosifying a clay-containing, water-based fluid. It is another object of the invention to provide a composition that can be viscosified upon contacting with an aqueous medium. It is also an object of the invention to provide a composition which upon becoming viscosified in an aqueous medium is thermostable. A further object of the invention is to provide a viscosified aqueous composition useful as drilling fluid, milling fluid, or mining fluid. Still another object is to provide a process for preparing the viscosified aqueous fluid. Other objects, aspects, and advantages of the invention will become more apparent as the invention is more fully disclosed hereinbelow.

According to a first embodiment of the invention, a composition capable of viscosifying a clay-containing, water-based fluid is provided which comprises a metal aluminate and optionally, a magnesium compound.

According to a second embodiment of the invention, a composition is provided which comprises a clay and a blend of a viscosity promoter and a magnesium compound wherein the viscosity promoter is a metal compound and the metal is selected from the group consisting of aluminum, iron, manganese and mixtures thereof.

According to a third embodiment of the invention, a process for preparing a viscosified aqueous composition for use as drilling fluid is provided which comprises contacting, in an aqueous medium, a clay with a metal aluminate and, optionally, a magnesium compound; or with a blend of a viscosity promoter and a magnesium compound.

According to a fourth embodiment of the invention, a process for controlling water loss of a drilling fluid comprises contacting the drilling fluid with a metal aluminate and, optionally, a magnesium compound; or with a blend of a viscosity promoter and a magnesium compound.

DETAILED DESCRIPTION OF THE INVENTION

The term "aqueous" used in the invention is generically referred to as, unless otherwise indicated, "of, relating to, or resembling water". Thus an aqueous composition referred to in the invention denotes a composition containing either water, a solution, or a suspension wherein the solution or suspension contains dissolved, partially dissolved, or undissolved salts. Examples of salts that can be present in the composition of the invention include, but are not limited to, sodium chloride, sodium bromide, sodium iodide, potassium chloride, potassium bromide, calcium chloride, calcium bromide, magnesium chloride, magnesium bromide, barium chloride, zinc chloride, zinc bromide, sodium sulfate, strontium chloride, and mixtures thereof. Generally the total salts content in the composition can vary widely from 0% (water) to as high as 80 weight %. The typical total salts content is in the range of from about 0.001 weight % to about 30 weight %. For example, a produced brine which is defined as the brine co-produced with oil or gas, or both, which generally is a hardness brine, i.e., containing at least 1,000 ppm of $Ca^{+2}$, $Ba^{+2}$, $Mg^{+2}$, or $Sr^{+2}$, or combinations thereof. A produced brine generally contains high salinity of from about 1% to about 30% total dissolved solids.

According to the first embodiment of the invention, a composition capable of viscosifying a clay-containing, water-based fluid is provided which comprises a metal aluminate and optionally, a magnesium compound. The clay useful in the invention can be any clay. Examples of suitable clays include, but are not limited to, kaolinite, halloysite, vermiculite, chlorite, attapulgite, smectite, montmorillonite, illite, saconite, sepiolite, palygorskite, Fuller's earth, and mixtures thereof. The presently preferred clay is montmorillonite clay. The presently most preferred clay is sodium montmorillonite, which is also known as bentonite.

Examples of the metal aluminates suitable for use in the invention include, but are not limited to, an alkali metal aluminate, an alkaline earth metal aluminate, and mixtures thereof. The presently preferred metal aluminate is an alkali meal aluminate such as, for example, lithium aluminate, sodium aluminate, potassium aluminate, and mixtures thereof. Among the alkali metal aluminates, sodium aluminate is most preferred because of its low cost and ready availability.

Based on the total weight % of the aqueous composition, the clay can be present in the composition in the range of from about 0.25 weight % to about 30 weight %, preferably about 0.5 weight % to about 25 weight %, and most preferably 1 weight % to 20 weight %. The weight % of the metal aluminate present in the aqueous composition is in the range of from about 0.001% to about 3%, preferably about 0.01% to about 2%, and most preferably from 0.025% to 1%.

According to the first embodiment of the invention, any suitable mixing means, such as, for example, mechanical blending, can be used to prepare the composition of the invention.

The magnesium compound suitable for use in the first embodiment of the invention can be any magnesium compound that, when added to the water-based fluid, makes the resulting composition non-acidic, i.e. at pH 7 or higher. Examples of suitable magnesium compounds include, but are not limited to, magnesium oxide, magnesium chloride, magnesium hydroxide, magnesium acetate, magnesium formate, magnesium propionate, magnesium butyrate, magnesium adipate, magnesium oxalate, magnesium carbonate, magnesium citrate, magnesium lactate, and mixtures thereof. The presently preferred magnesium compound is magnesium oxide because of its low cost, safety, and availability. The weight % of the magnesium compound in the aqueous composition is generally the same as those described for the metal aluminate.

According to the second embodiment of the invention, a composition comprising a clay and a blend of a viscosity promoter and a magnesium compound is provided. The scope of the clay and magnesium compound is the same as that described above.

The viscosity promoter useful for the present invention can be a metal aluminate, a metal manganate, an inorganic or organic compound. of aluminum, an inorganic or organic compound of iron, or an inorganic or organic compound of manganese. The scope of the metal aluminate is the same as that described in the first embodiment of the invention. The aluminum compound can be an aluminum halide such as, for example, aluminum chloride, aluminum bromide, and aluminum iodide; an aluminum carboxylate such as, for example, aluminum formate, aluminum acetate, aluminum propionate, aluminum butyrate, aluminum stearate, and aluminum adipate; aluminum sulfate; aluminum phosphate; aluminum nitrate; and mixtures thereof. The presently preferred aluminum compounds are aluminum chloride, aluminum sulfate, aluminum acetate, and mixtures thereof because of their low cost and availability.

The ferric compound can be an ferric halide such as, for example, ferric chloride, ferric bromide, and ferric iodide; an ferric carboxylate such as, for example, ferric formate, ferric acetate, ferric propionate, ferric butyrate, ferric stearate, and ferric adipate; ferric sulfate; ferric phosphate; ferric nitrate; and mixtures thereof. The presently preferred ferric compounds are ferric chloride, ferric sulfate, ferric acetate, and mixtures thereof because of their low cost and availability.

The ferrous compound can be an ferrous halide such as, for example, ferrous chloride, ferrous bromide, and ferrous iodide; an ferrous carboxylate such as, for example, ferrous formate, ferrous acetate, ferrous propionate, ferrous butyrate, ferrous stearate, and ferrous adipate; ferrous sulfate; ferrous phosphate; ferrous nitrate; and mixtures thereof. The presently preferred ferrous compounds are ferrous chloride, ferrous sulfate, ferrous acetate, and mixtures thereof because of their low cost and availability.

The manganese compound can be an manganese halide such as, for example, manganese chloride, manganese bromide, and manganese iodide; an manganese carboxylate such as, for example, manganese formate, manganese acetate, manganese propionate, manganese butyrate, manganese stearate, and manganese adipate; manganese sulfate; manganese phosphate; manganese nitrate; and mixtures thereof. The presently preferred manganese compounds are manganese chloride, manganese sulfate, manganese acetate, and mixtures thereof because of their low cost and availability.

The blend of a viscosity promoter and a magnesium compound useful in the second embodiment of the invention can be prepared by mixing the viscosity promoter and magnesium compound in any means, such as, for example, a dry blender, known to one skilled in the art.

Generally the weight ratio of the viscosity promoter to the magnesium compound is in the range of from about 1:19 to about 3:1, preferably about 1:15 to about 2:1, and most preferably from 1:9 to 1:1. The clay can be present in the aqueous composition, based on the total weight % of the final aqueous composition equaling 100%, in the range of from about 0.25 weight % to about 30 weight %, preferably about 0.5 weight % to about 25 weight %, and most preferably 1 weight % to 20 weight %. The blend can be present in the aqueous composition in the range of from about 0.001 weight % to about 3 weight %, preferably about 0.01 weight % to about 2 weight %, and most preferably 0.025 weight % to weight %.

A dry composition containing the blend of the viscosity promoter and a magnesium compound, and a clay can also be used to viscosify a water-based composition. The weight ratio of the blend to clay in the dry composition can be from about 1:8 to about 1:999, preferably 1:9 to 1:99.

The process for preparing the composition of the second embodiment of the invention is the same as that disclosed for the composition of the first embodiment of the invention.

Water, a solution or a suspension as described above is generally included in the compositions of the first and second embodiments of the invention to prepare aqueous composition. A produced brine described above can also be used as a component of the compositions of the first and second embodiment of the invention.

A polymer can also be present in the above disclosed compositions in the first and second embodiments of the invention. The term "polymer" used herein denotes, unless otherwise indicated, a homopolymer, a copolymer, a terpolymer, or a tetrapolymer. Polymers suitable for use in the composition are those capable of further increasing the viscosity of the composition in aqueous form and include, but are not limited to, biopolysaccharides, cellulose ethers, and acrylamide-based polymers. Suitable polymers can be those disclosed in U.S. Pat. No. 4,629,747 which is incorporated herein by reference. The weight % of the polymer, if present, preferably in the aqueous composition, can be in the range of from about 0.001% to about 2%.

A weighting agent can be added to the viscosified aqueous composition to increase the density of the water based fluid. Suitable weighting agents include, but are not limited to barite, hematite, carbonates, galena, and mixtures thereof.

According to the third embodiment of the invention, a process for preparing a viscosified aqueous composition for use as drilling fluid comprises contacting, in an aqueous medium, a clay with a metal aluminate and, optionally, a magnesium compound. A preferred embodiment comprises contacting a blend of a viscosity promoter and a magnesium compound with an aqueous medium containing a clay. Alternatively, the process of the third embodiment of the invention can also be carried out by contacting a dry composition of the blend and clay with a water-based fluid. The scope and weight % of the aqueous medium, clay, metal aluminate, the blend of the viscosity-promoter and magnesium compound, and the dry composition are the same as described above. The composition useful in the third embodiment can also comprise a polymer. The scope of the polymer is also the same as described above. The aqueous composition can also be prepared by the process described above.

EXAMPLE I

The purpose of this example is to show that an aqueous medium is not viscosified well upon mixing of a clay and magnesium oxide until it has been mixed for more than 45 minutes or aged at 150° F.

The runs were carried out by adding 350 ml of tap water to each of three quart-jars. While stirring the water samples with a Multi-mixer, 15 grams bentonite clay was added to each sample. Next, 2.0 grams of reagent grade magnesium oxide from Fisher Scientific was added to sample 2 and 3 immediately after the bentonite addition. All samples were stirred 20 more minutes and tested immediately. Data reported in Table I under "Initial Results" represent readings on the Fann VG meters (Model 35A) at RPM shown. By definition, the apparent viscosity in centipoise is 50% of the reading at 600 rpm. Sample 1 was a control run containing no magnesium oxide. Sample 3 was retested after stirring 45 minutes and 135 minutes. All samples were then capped and rolled 4 hours in a pre-heated oven at 150° F., cooled, stirred 5 minutes, and tested at about 85° F. These results are reported under "After Rolling at 150° F".

TABLE I

| Sample Number | Minutes Stirred | Initial Results | | | After Rolling at 150° F. | | |
| --- | --- | --- | --- | --- | --- | --- | --- |
| | | 600/300 | 200/100 | 6/3 | 600/300 | 200/100 | 6/3 |
| 1 | 20 | 14/10 | 8/6 | 2.5/2 | 15/10 | 8/6 | 3/2 |
| 2 | 20 | 35/31 | 29/27 | 24/24 | 158/147 | 139/128 | 88/58 |
| 3 | 20 | 34/31 | 29/26 | 24/23 | | | |
| 3 | 45 | 55/51 | 50/47 | 42/40 | | | |
| 3 | 135 | >300/288 | 277/261 | 149/117 | 211/186 | 180/172 | 120/80 |

The viscosified aqueous composition can be used in well treating, drilling, workover, or completion in oil field operations by those skilled in the art. Generally, the viscosified aqueous composition can be used in any drilled wells having a temperature in the range of from about 75° F. to about 350° F., preferably 80° F. to 300° F.

According to the fourth embodiment of the invention, a process for controlling fluid loss of a water-based drilling fluid comprising adding a fluid loss control additive to the drilling fluid wherein the additive is selected from the group consisting of a metal aluminate, a blend of a viscosity promoter and a magnesium compound, a dry composition comprising the blend and a clay, or mixtures thereof. The scope and weight % of the aqueous medium, clay, metal aluminate, the blend and the dry composition are the same as those described above. A polymer as described above can also be present in the composition. The aqueous composition of drilling fluid containing the additive can also be prepared by the process described above.

The following specific examples are intended to illustrate the advantages of the present invention and are not intended to unduly limit the scope of the invention.

These results show that the aqueous composition containing clay and magnesium oxide requires mixing at a high shear for an extended period or heating at a high temperature for developing high viscosities.

EXAMPLE II

This example illustrates the viscosification of an aqueous medium comprising clay with sodium aluminate. The runs was carried out as follows. In a quart jar, 10 grams of bentonite clay were mixed with 350 ml of tap water while stirring with a Multi-mixer. The mixture was stirred 10 minutes on the Multi-mixer. After adding sodium aluminate to the mixture as shown in Table II, the resulting composition was stirred for 10 more minutes. The same were immediately transferred into pint jars and tested on the Fann VG meters (Model 35A). Data reported in Table II under "Initial Results" represents readings at RPM shown in the Table. After initial testing, the pint jars were sealed and rolled in a preheated roller oven at 176° F. for 3 hours. Next, the samples were cooled, stirred 5 minutes on the Multi-mixer, and retested at about 85° F. Test results are reported under "After Rolling at 176° F.". Sample 15–17 were included as control.

TABLE II

| Sample Number | Material Added | Gram | Initial Results | | | After Rolling at 176° F. | | |
|---|---|---|---|---|---|---|---|---|
| | | | 600/300 | 200/100 | 6/3 | 600/300 | 200/100 | 6/3 |
| 11 | None | — | 10/6 | 5/4 | 2/1 | 7/4 | 3/2 | 1/1 |
| 12 | Sodium aluminate | 0.5 | 93/82 | 72/60 | 25/15 | 35/32 | 30/27 | 20/19 |
| 13 | Sodium aluminate | 1.0 | 71/64 | 59/51 | 30/16 | 30/28 | 27/24 | 17/15 |
| 14 | Sodium aluminate | 1.5 | 29/26 | 25/22 | 15/13 | 17/15 | 13/12 | 10/9 |
| 15 | Magnesium oxide | 0.5 | 18/14 | 12/11 | 9/8 | 14/11 | 9/8 | 7/7 |
| 16 | Magnesium oxide | 1.0 | 22/18 | 17/15 | 12/11 | 29/25 | 23/21 | 15/15 |
| 17 | Magnesium oxide | 1.5 | 21/17 | 16/14 | 11/10 | 53/49 | 46/41 | 26/24 |

Sodium aluminate - Sodium aluminate granule (GU55) from United States Aluminate Company, Inc.
Magnesium oxide - MagChem 40 from Martin Marietta.

Table II demonstrates that aqueous compositions containing clay and sodium aluminate (sample 12–14) had considerably higher viscosities than those containing clay only (sample 11) and those containing clay and magnesium oxide (samples 1–3 and 15–17) in initial tests. However, the sodium aluminate-containing samples (samples 12–14) lost some viscosities after rolling at 176° F.

EXAMPLE III

This example illustrates the viscosity of an aqueous composition comprising clay and a blend of sodium aluminate and magnesium oxide.

The runs were carried out the same as those in Example II except that a blend of sodium aluminate and magnesium oxide was used to replace sodium aluminate. The results shown in Table III indicate that the compositions not only developed good viscosity but also maintained the viscosity after aging at 176° F.

medium and the resulting viscosified aqueous composition retains its viscosity upon aging at an elevated temperature. This example differs from Example III in that the clay and the blend were mixed followed by adding the resulting mixture to an aqueous medium.

The runs were carried out by adding 350 ml tap water to a quart jar. While stirring the water samples with a Multi-mixer, the material shown in Table IV was added. All samples were stirred for 10 minutes. Immediately after the stirring, they were transferred into pint jars and tested initially. Data reported in Table IV under "Initial Results" represent readings on the Fann VG meters (Model 35A) at RPM shown. Next, the samples were capped, rolled in a pre-heated oven at 176° F. for four hours, cooled to about 85° F., stirred 2 minutes, and retested. This data is presented under "After Rolling at 176° F.".

TABLE III

| Sample Number | Material Added | Gram | Initial Results | | | After Rolling at 176° F. | | |
|---|---|---|---|---|---|---|---|---|
| | | | 600/300 | 200/100 | 6/3 | 600/300 | 200/100 | 6/3 |
| 21 | Blend 25 | 0.5 | 25/21 | 19/16 | 12/9 | 63/56 | 20/46 | 18/16 |
| 22 | Blend 25 | 1.0 | 51/47 | 44/38 | 26/19 | 92/84 | 77/72 | 20/16 |
| 23 | Blend 25 | 1.5 | 50/44 | 42/37 | 24/20 | 86/73 | 65/58 | 20/18 |
| 24 | Blend 50 | 0.5 | 74/61 | 54/46 | 22/18 | 89/80 | 72/62 | 36/23 |
| 25 | Blend 50 | 1.0 | 80/72 | 64/54 | 17/10 | 93/84 | 75/63 | 35/19 |
| 26 | Blend 50 | 1.5 | 75/65 | 59/49 | 20/11 | 78/71 | 64/54 | 31/20 |
| 27 | Blend 75 | 0.5 | 90/80 | 72/62 | 34/20 | 75/70 | 65/60 | 37/31 |
| 28 | Blend 75 | 1.0 | 86/79 | 72/62 | 34/18 | 66/61 | 58/52 | 32/29 |
| 29 | Blend 75 | 1.5 | 47/43 | 41/37 | 23/19 | 40/36 | 33/30 | 19/17 |

Blend 25 - Blend contains 25% Sodium aluminate and 75% magnesium oxide (MagChem 40).
Blend 50 - Blend contains 50% Sodium aluminate and 50% magnesium oxide (MagChem 40).
Blend 75 - Blend contains 75% Sodium aluminate and 25% magnesium oxide (MagChem 40).

EXAMPLE IV

This example illustrates that a composition comprising a clay and a blend of a metal aluminate and a magnesium compound viscosifies instantly upon mixing in an aqueous

TABLE IV

| Sample Number | Material Added | Gram | Initial Results | | | After Rolling at 176° F. | | |
|---|---|---|---|---|---|---|---|---|
| | | | 600/300 | 200/100 | 6/3 | 600/300 | 200/100 | 6/3 |
| 31 | Bentonite | 16.0 | 19/12 | 9/7 | 4/3 | 18/12 | 9/7 | 5/3 |
| 32 | Blend 1 | 15.5 | 62/55 | 50/44 | 28/19 | 22/17 | 15/13 | 10/10 |
| 33 | Blend 2 | 15.5 | 35/30 | 29/27 | 24/23 | 29/23 | 21/19 | 16/16 |
| 34 | Blend 3 | 15.5 | 53/48 | 46/42 | 28/19 | 99/93 | 90/84 | 56/44 |
| 35 | Blend 4 | 16.0 | 35/30 | 28/24 | 15/10 | 16/13 | 12/11 | 9/8 |
| 36 | Blend 5 | 16.0 | 32/28 | 26/23 | 21/21 | 27/23 | 21/19 | 18/18 |
| 37 | Blend 6 | 16.0 | 49/44 | 41/36 | 23/17 | 104/96 | 90/80 | 48/31 |

Blend 1 = Mixture of 15 g bentonite and 0.5 g Na-Aluminate.
Blend 2 = Mixture of 15 g bentonite and 0.5 g MagChem 40.
Blend 3 = Mixture of 15 g bentonite, 0.25 g Na-Aluminate, and 0.25 g MagChem 40.
Blend 4 = Mixture of 15 g bentonite and 1.0 g Na-Aluminate.
Blend 5 = Mixture of 15 g bentonite and 1.0 g MagChem 40.
Blend 6 = Mixture of 15 g bentonite, 0.5 g Na-Aluminate, and 0.5 g MagChem 40.

The data shown in Table IV indicate that the water-based fluid is viscosified by addition of a composition comprising bentonite, sodium aluminate and magnesium oxide (samples 34 and 37). The fluids containing bentonite and magnesium oxide (samples 33 and 36) were less viscosified initially. All samples that did not contain a blend or mixture of sodium aluminate and magnesium oxide (samples 32, 33, 35 and 36) lost some of-their viscosity after rolling at 176° F.

EXAMPLE V

This example illustrates that a blend of an aluminum compound and a magnesium compound also viscosifies a clay-containing, water-based fluid whereas an aluminum compound alone does not appreciably viscosify the fluid.

The runs were carried out in quart jars each containing 350 ml of tap water. Bentonite (15 g) was added to each jar while stirring on a Multi-mixer. Immediately after the bentonite addition, the test material shown in the Table V below was added and all samples were stirred for 10 minutes. Immediately after stirring, they were then tested on Fann VG meters (Model 35A). Reading at RPM shown are reported in the Table V.

TABLE V

| Sample Number | Material Used(pH)[a] | 600/300 | 200/100 | 6/3 |
|---|---|---|---|---|
| 41 | None (>8.0) | 14/10 | 8/6 | 2.5/2 |
| 42 | 0.5 g MgO (>9.5) | 31/26 | 24/22 | 19/19 |
| 43 | 1.0 g MgO (>9.5) | 36/31 | 29/27.5 | 23/23 |
| 44 | 0.5 g Al(OAc)$_3$ (>8.5)[b] | 37/32 | 30/27 | 20/15 |
| 45 | 0.5 g MgO + 0.5 g Al(OAc)$_3$ (>8.5) | 53/49 | 46/42 | 27/20 |
| 46 | 0.75 g MgO + 0.25 g Al(OAc)$_3$ (>9.5) | 115/110 | 96/82 | 37/35 |
| 47 | 0.90 g MgO + 0.10 g Al(OAc)$_3$ (10.3) | >300/>300 | 286/267 | 117/94 |
| 48 | 1.0 g AlCl$_3$.6H$_2$O (3.6) | 8/6 | 5/4 | 2.5/2 |
| 49 | 1.0 g AlCl$_3$.6H$_2$O & NaOH (10.9)[c] | 6/4 | 3.5/2.5 | 1.5/1 |
| 50 | 0.1 g AlCl$_3$.6H$_2$O & NaOH (9.9)[c] | 27/23 | 21/20 | 19/18.5 |
| 51 | 0.9 g AlCl$_3$.6H$_2$O + 0.1 g NaOH (3.5) | 10/8 | 6.5/5 | 3/3 |
| 52 | 0.5 g AlCl$_3$.6H$_2$O + 0.5 g NaOH (11.1) | 22/18 | 15/13 | 10/8 |
| 53 | 0.8 g MgO + 0.2 g AlCl$_3$.6H$_2$O (10.1) | 57/54 | 51/46 | 31/22 |
| 54 | 0.9 g MgO + 0.1 g AlCl$_3$.6H$_2$O (10.0) | 119/110 | 107/101 | 70/48 |
| 55 | 0.95 g MgO + 0.05 g AlCl$_3$.6H$_2$O (10.4) | 79/73 | 70/64 | 47/38 |
| 56 | 1.0 g Al$_2$(SO$_4$)$_3$.12H$_2$O (3.0) | 10/8 | 7/5 | 3.5/3 |
| 57 | 0.8 g MgO + 0.2 g Al$_2$(SO$_4$)$_3$.12H$_2$O (10.3) | 84/80 | 77/71 | 44/26 |
| 58 | 0.9 g MgO + 0.1 g Al$_2$(SO$_4$)$_3$.12H$_2$O (10.4) | 114/108 | 103/95 | 66/43 |
| 59 | 0.95 g MgO + 0.05 g Al$_2$(SO$_4$)$_3$.12H$_2$O (10.4) | 133/126 | 122/114 | 83/61 |
| 60 | 1.0 g AlCl$_3$.H$_2$O (6.5) | 24/20 | 17/14 | 10/9 |
| 61 | 0.5 g MgO + 0.50 g AlCl$_3$.H$_2$O (>9.5) | 94/87 | 78/73 | 18/14 |
| 62 | 0.75 g MgO + 0.25 g AlCl$_3$.H$_2$O (10.2) | 230/202 | 181/168 | 68/67 |
| 63 | 0.9 g MgO + 0.1 g AlCl$_3$.H$_2$O (>10) | >300/>300 | 288/261 | 105/81 |
| 64 | 0.9 g MgO + 0.1 g Al-Stearate (>10) | 42/37 | 34/31.5 | 26/26 |
| 65 | 0.5 g Mg(OH)$_2$ (9.2) | 20/16 | 10/8 | 7/7 |
| 66 | 0.5 g mg(OH)$_2$ + 0.5 g Na-Aluminate (10.5) | 155/141 | 133/121 | 55/41 |
| 67 | 0.5 g CaO + 0.5 g Na-Aluminate (11.5) | 35/29 | 26/24 | 16/12.5 |
| 68 | 0.5 g Mg(OAc)$_2$ (7.4)[d] | 8/6 | 5/4 | 2/2 |
| 69 | 0.5 g Mg(OAc)$_2$ + 0.5 g Na-Aluminate (9.4) | 131/116 | 111/101 | 50/42 |
| 70 | 0.5 g Ca(OH)$_2$ + 0.5 g Na-Aluminate | 30/25 | 22/19 | 13/9 |
| 71 | 0.5 g Ca(OH)$_2$ + 0.5 g AlCl$_3$.6H$_2$O | 26/22 | 20/16 | 10/9 |
| 72 | 1.0 g Lab Preparation #1[e] (>9.0) | 20/15 | 12/10 | 8/9 |

TABLE V-continued

| Sample Number | Material Used(pH)[a] | 600/300 | 200/100 | 6/3 |
|---|---|---|---|---|

[a] The numbers in parenthesis are pH values. The ">" indicates the pH values were estimated. Those samples having "+" were blends of chemicals shown.
[b] Al(OAc)$_3$, aluminum acetate.
[c] NaOH (50 w/v %) was used to adjust the pH to the value shown.
[d] Mg(OAc)$_2$, magnesium acetate.
[e] In a beaker, mixed 9.0 g MgO with 200 ml of deionized water then added 1.0 g of aluminum acetate. This mixture was stirred for about 1 1/2 hour at about 25° C. and then dried in an oven at about 250° F. The residue was ground and it was entered as lab preparation #1.

As shown in Table V, blends of magnesium oxide and aluminum acetate (samples 45–47) provided considerably higher viscosity than either magnesium oxide (samples 42–43) or aluminum acetate (sample 44) alone. Table V also shows that blend of magnesium oxide and aluminum chloride (samples 53–54 and 62–63) provided significantly higher viscosity than either magnesium oxide (sample 42–43) or aluminum chloride (samples 48 and 60) alone. Similarly, blends of magnesium oxide and aluminum sulfate (samples 57–59) viscosified the clay-containing fluid much better than either magnesium oxide (samples 42–43) or aluminum sulfate (sample 56) alone. Table V further shows that an aluminum long chain carboxylate such as aluminum stearate (sample 64) was also effective on increasing the viscosity of the fluid. Finally, Table V demonstrates that blends of other magnesium compounds and aluminum compounds (samples 66 and 69) were also very effective.

To determine whether the effect of the invention blend was due to an increase in alkalinity of the blend in the presence of basic magnesium oxide or magnesium hydroxide, tests were carried out by raising the pH of the aqueous composition (samples 49–50) using NaOH and using blends containing NaOH (samples 51–52). The results in Table V indicate, that increasing pH with NaOH did not improve the viscosity of the fluid. Moreover, Table V shows that blends of either calcium oxide or calcium hydroxide and either sodium aluminate (samples 67–70) or aluminum chloride (sample 71) did not significantly increase the viscosity of the water-based composition. Table V additionally shows that if blend of magnesium oxide and aluminum acetate (sample 72) was pre-reacted in the presence of water and then dried at an elevated temperature, the blend loss its effectiveness for increasing the viscosity of the water-based composition.

Those samples shown in Table V that had increased viscosity were further rolled at 150°–176° F. as described in Example IV. They were found to be thermally stable.

EXAMPLE VI

This example illustrates that blends containing either ferric chloride or manganese acetate and magnesium oxide are also effective on increasing the viscosity of the water-based compositions.

The runs were carried out the same as those described in Example V except the material added to the clay-containing composition, as noted in Table VI.

TABLE VI

| Sample Number | Material Used(pH)[a] | 600/300 | 200/100 | 6/3 |
|---|---|---|---|---|
| 91 | 1.0 g FeCl$_3$ hexahydrate (2.1) | 8/6 | 5/4 | 2/2 |
| 92 | 0.90 g MgO + 0.10 g FeCl$_3$ hexahydrate (10.3) | 164/149 | 143/131 | 83/48 |
| 93 | 0.90 g FeCl$_3$ hexahydrate + 0.10 g NaOH (2.2) | 10/8 | 6.5/6 | 4/3 |
| 94 | 0.50 G FeCl$_3$ hexahydrate + 0.50 g NaOH (11.2) | 44/39 | 37/34 | 25/22 |
| 95 | 0.90 g MgO + 0.10 g FeCl$_2$ tetrahydrate (10.3) | 88/83 | 80/71 | 54/46 |
| 96 | 0.50 g Mn-Acetate (7.4) | 12/9 | 8/6.5 | 4/4 |
| 97 | 0.90 g MgO + 0.10 g Cu-Acetate (10.2) | 115/108 | 104/101 | 67/35 |
| 98 | 0.50 g Mn-Chloride (7.3) | 10/7 | 6/5 | 3/3 |
| 99 | 0.90 g MgO + 0.10 g Mn-Chloride (10.1) | 118/115 | 111/103 | 67/42 |
| 100 | 0.90 g MgO + 0.10 g Mn-Chloride (10.2) | 17/13 | 11/9 | 8/7.5 |
| 101 | 0.90 g MgO + 0.10 g Ti-K-Oxalate (10.2) | 26/22 | 20/18 | 16/15.5 |
| 102 | 0.90 g MgO + 0.10 g Ce(SO$_4$)$_2$ hydrate (10.2) | 38/34 | 31/28 | 22.5/22 |
| 103 | 0.90 g MgO + 0.10 g Cr(C$_2$H$_3$O$_2$)$_3$ monohydrate (10.3) | 13/10 | 9/8 | 7/7 |
| 104 | 0.50 g Ca(OH)$_2$ + 0.50 g Na-Aluminate (11.4) | 30/25 | 22/19 | 13/9 |
| 105 | 0.50 g Ca(OH)$_2$ + 0.50 g AlCl$_3$ hexahydrate (10.9) | 26/22 | 20/16 | 10/9 |
| 106 | 0.50 g MgO + 0.50 g Stannous Sulfate (9.1) | 34/29 | 27/24 | 19/18 |
| 107 | 0.50 g MgO + 0.50 g Na-Stannate (10.8) | 12/8 | 6/4 | 2/2 |
| 108 | 0.90 g MgO + 0.10 g Na-Stannate (10.5) | 14/10 | 9/7 | 6/6 |
| 109 | 0.90 g MgO + 0.10 g ZnCl$_2$ (10.2) | 23/18 | 16/14.5 | 13/12 |
| 110 | 0.90 g MgO + 0.10 g NaCl (10.3) | 31/26 | 24/22 | 9/8 |

[a] See footnote a, TABLE V

Table VI shows that, an iron compound, when blended, with a magnesium compound, significantly increases the viscosity of the water-based compositions (samples 92 and 95) when compared to controls (runs 41–43, and 91) Similar results were found with a manganese compound (samples 97 and 99). Other runs shown in Table VI were included to demonstrate calcium hydroxide, zinc chloride, cupric acetate, chromium acetate, titanium potassium oxalate, cesium sulfate, and tin compounds were not effective on increasing the viscosity of the water-based compositions.

EXAMPLE VII

This example demonstrates that the invention additives can also be used to control water loss of a drilling fluid.

The runs were carried out as follows:
Alternatively, the viscosity promoter and magnesium compound can be blended by dissolving or suspending them in an aqueous medium. The aqueous medium is the same as described above.

In quart jars, bentonite (7.5 g) was mixed with 350 ml of tap water and the mixture was stirred for 10 minutes with a Multi-mixer. Next, 1.0 gram of Na-aluminate or the blend of MgO and Na-aluminate was added to the mixture and stirred for another 10 minutes. The polymers shown in table VII were then added and stirred for 10 more minutes. 15 g Rev dust was added to represent drill solids to all samples and stirred 10 more minutes. Immediately after the stirring, the samples were transferred into pint jars and tested on the Fann VG meters (Model 35A). All samples were then capped and rolled 3 hours in a preheated oven at 176° F., cooled, stirred for 5 minutes, and tested at about 83° F. Gel strengths and water loss were measured according to the API RP 13B-1 procedure. The results are shown in Table VII.

TABLE VII[a]

| | | Sample Number | | | | | |
|---|---|---|---|---|---|---|---|
| | | 121 | 122 | 123 | 124 | 125 | 126 |
| Sodium aluminate (g) | | 1.0 | — | — | — | — | — |
| MgO + Na-aluminate (g)[b] | | — | 1.0 | 1.0 | 1.0 | 1.0 | — |
| 199F polymer (g)[c] | | 6.0 | 6.0 | — | — | — | 6.0 |
| Drillstar HT white starch (g)[d] | | — | — | 6.0 | — | — | — |
| IDF Floplex (g)[e] | | — | — | — | 6.0 | — | — |
| Drispac Regular (g)[f] | | — | — | — | — | 2.0 | — |
| Tested Immediately upon mixing | | | | | | | |
| Viscosity | 600/300 | 57/51 | 68/62 | 66/58 | 101/76 | 153/118 | 7/5 |
| | 200/100 | 47/41 | 56/47 | 55/47 | 62/47 | 101/75 | 3.5/3 |
| | 6/3 | 23/16 | 26/12 | 37/23 | 26/27 | 21/16 | 2/1 |
| Gel strength (lbs/100 ft$^2$) | | 16/13 | 17/14 | 19/16 | 35/73 | 19/44 | 2/2 |
| Tested after 3 hour-rolling at 176°F. | | | | | | | |
| Viscosity | 600/300 | 64/52 | 94/81 | 37/28 | 115/79 | 150/113 | 30/20 |
| | 200/100 | 44/37 | 70/61 | 26/21 | 65/46 | 98/72 | 17/13 |
| | 6/3 | 27/5/23 | 50/46 | 14/14 | 18/18 | 18/14 | 6/6 |
| Gel strength (lbs/100 ft$^2$) | | 19/25 | 43/39 | 12/19 | 21/51 | 15/35 | 6/10 |
| Water loss (ml/30 minutes) | | 10.1 | 9.8 | 5.2 | 6.9 | 9.1 | 13.2 |
| pH | | 10.9 | 10.9 | 11.0 | 11.1 | 11.3 | 7.9 |

[a]All samples contained 350 ml of tap water, 7.5 g of bentonite, and 15 g of Rev dust which was obtained from Milwhite, Inc., Houston, Texas.
[b]Blend of MgO and Na-aluminate (50:50).
[c]A starch obtained from Grain Processing Corp., Iowa.
[d]A starch obtained from Baker Chemicals.
[e]Modified polysaccharide obtained from International Drilling Fluids.
[f]A polyanionic cellulose obtained from Drilling Specialties, Inc., Bartlesville, Oklahoma.

Table VII shows that without either an aluminum compound or a blend of a magnesium compound and an aluminum compound, the clay-containing, water-based fluid lost 13.2 ml water in 30 minutes (sample 126). The water loss was significantly reduced to less than 10.1 ml, as low as 5.2 ml for fluids containing the composition of the invention (samples 121–125). Also shown in Table VII is that, the fluid which did not contain any of the compositions of the present invention (sample 126), the strength of the gel formed was very low (2/2). The gel strength of the fluids containing small quantity of the composition of the present invention (smaples 121–125) was remarkably increased. These results demonstrate that the invention compositions are well-suited for controlling water loss and improving the gel strength of a drilling fluid containing a gelable polymer.

The results shown in the above examples clearly demonstrate that the present invention is well adapted to carry out the objects and attain the end and advantages mentioned as well as those inherent therein. While modifications may be made by those skilled in the art, such modifications are encompassed within the spirit of the present invention as defined by the specification and the claims.

That which is claimed is:

1. A composition for viscosifying a clay-containing, water-based fluid comprising a clay, a viscosity promoter, and a magnesium compound wherein said viscosity promoter is selected from the group consisting of alkali metal aluminate, alkaline earth metal aluminate, aluminum halide, aluminum carboxylate, aluminum sulfate, aluminum phosphate, aluminum nitrate, iron halide, iron carboxylate, iron sulfate, iron phosphate, iron nitrate, manganese halide, manganese carboxylate, manganese sulfate, manganese phosphate, manganese nitrate, and mixtures of any two or more thereof;

said magnesium compound is selected from the group consisting of magnesium oxide, magnesium hydroxide, magnesium chloride, magnesium acetate, magnesium formate, magnesium propionate, magnesium butyrate, magnesium citrate, magnesium lactate, and mixtures of any two or more thereof; and said clay is selected from the group consisting of kaolinite, halloysite, vermiculite, chlorite, attapulgite, smectite, montmorillonite, illite, saconite, sepiolite, palygorskite, Fuller's earth, and mixtures of any two or more thereof.

2. A composition according to claim 1 wherein said viscosity promoter is selected from the group consisting of sodium aluminate, aluminum chloride, aluminum sulfate, aluminum acetate, iron chloride, iron sulfate, iron acetate, manganese chloride, manganese sulfate, manganese acetate, and mixtures of any two or more thereof.

3. A composition according to claim 1 wherein said magnesium compound is selected from the group consisting of magnesium oxide, magnesium hydroxide, magnesium acetate, and mixtures of any two or more thereof.

4. A composition according to claim 1 wherein the weight ratio of said viscosity promoter to said magnesium compound is in the range of from about 1:19 to about 3:1.

5. A composition according to claim 4 wherein said range is from 1:9 to 1:1.

6. A composition according to claim 1 wherein the weight % of said viscosity promoter and magnesium compound is in the range of from about 0.001% to about 3% based on total weight of the water-based fluid.

7. A composition according to claim 6 wherein said range is from 0.025% to 1%.

8. A composition according to claim 1 wherein said clay is sodium montmorillonite (bentonite).

9. A composition according to claim 1 wherein the weight percent of said clay is in the range of from about 0.25% to about 30% based on total weight of the water-based fluid.

10. A composition according to claim 9 wherein said range is from 1% to 20%.

11. A composition for viscosifying a clay-containing, water-based fluid consisting essentially of a clay, a viscosity promoter, and a magnesium compound wherein said viscosity promoter is selected from the group consisting of alkali metal aluminate, alkaline earth metal aluminate, almuninum halide, aluminum carboxylate, aluminum sulfate, aluminum phosphate, aluminum nitrate, iron halide, iron carboxylate, iron sulfate, iron phosphate, iron nitrate, manganese halide, manganese carboxylate, manganese sulfate, manganese phosphate, manganese nitrate, and mixtures of any two or more thereof;

said magnesium compound is selected from the group consisting of magnesium oxide, magnesium hydroxide, magnesium chloride, magnesium acetate, magnesium formate, magnesium propionate, magnesium butyrate, magnesium citrate, magnesium lactate, and mixtures of any two or more thereof; and said clay is selected from the group consisting of kaolinite, halloysite, vermiculite, chlorite, attapulgite, smectite, montmorillonite, illite, saconite, sepiolite, palygorskite, Fuller's earth, and mixtures of any two or more thereof.

12. A composition capable of viscosifying a water-based fluid consisting essentially of: (1) a viscosity promoter selected from the group consisting of sodium aluminate, aluminum chloride, aluminum sulfate, aluminum acetate, iron chloride, iron sulfate, iron acetate, manganese chloride, manganese sulfate, manganese acetate, and mixtures of any two or more thereof; (2) a magnesium compound selected from the group consisting of magnesium oxide, magnesium hydroxide, magnesium acetate, and mixtures of any two or more thereof wherein the weight ratio of said viscosity promoter to said magnesium compound is in the range of from 1:9 to 1:1; and (3) bentonite such that said water-based fluid comprises from 1 weight % to 20 weight % of bentonite.

13. A process for viscosifying a clay-containing, water-based fluid comprising contacting said fluid with a viscosity promoter and a magnesium compound wherein said viscosity promoter is selected from the group consisting of an alkali metal aluminate, an alkaline earth metal aluminate, an aluminum halide, an aluminum carboxylate, aluminum sulfate, aluminum phosphate, aluminum nitrate, an iron halide, an iron carboxylate, iron sulfate, iron phosphate, iron nitrate, an manganese halide, an manganese carboxylate, manganese sulfate, manganese phosphate, manganese nitrate, and mixtures of any two or thereof;

said magnesium compound is selected from the group consisting of magnesium oxide, magnesium hydroxide, magnesium chloride, magnesium acetate, magnesium formate, magnesium propionate, magnesium butyrate, magnesium citrate, magnesium lactate, and mixtures of any two or more thereof; and said clay is selected from the group consisting of kaolinite, halloysite, vermiculite, chlorite, attapulgite, smectite, montmorillonite, illite, saconite, sepiolite, palygorskite, Fuller's earth, and mixtures of any two or more thereof.

14. A process according to claim 13 wherein said viscosity promoter is selected from the group consisting of sodium aluminate, aluminum chloride, aluminum sulfate, aluminum acetate, iron chloride, iron sulfate, iron acetate, manganese chloride, manganese sulfate, manganese acetate, and mixtures of any two or more thereof.

15. A process according to claim 13 wherein said magnesium compound is selected from the group consisting of magnesium oxide, magnesium acetate, and mixtures of any two or more thereof.

16. A process according to claim 13 wherein the weight ratio of said viscosity promoter to said magnesium compound is in the range of from 1:9 to 1:1.

17. A process according to claim 13 wherein the weight % of said viscosity promoter and magnesium compound is in the range of from 0.025% to 1% based on total weight of the water-based fluid.

18. A process according to claim 13 wherein said clay is sodium montmorillonite (bentonite).

19. A process according to claim 13 wherein the weight percent of said clay is in the range of from about 0.25% to about 30% based on total weight of the water-based fluid.

20. A process according to claim 13 wherein the weight ratio of said viscosity promoter and magnesium compound to said clay is from about 1:8 to about 1:999.

21. A process for controlling fluid loss of a clay-containing, water-based drilling fluid comprising adding a viscosity promoter and a magnesium compound to said drilling fluid wherein said viscosity promoter is selected from the group consisting of alkali metal aluminate, alkaline earth metal aluminate, aluminum halide, aluminum carboxylate, aluminum sulfate, aluminum phosphate, aluminum nitrate, iron halide, iron carboxylate, iron sulfate, iron phosphate, iron nitrate, manganese halide, manganese carboxylate, manganese sulfate, manganese phosphate, manganese nitrate, and mixtures of any two or more thereof;

said magnesium compound is selected from the group consisting of magnesium oxide, magnesium hydroxide, magnesium chloride, magnesium acetate, magnesium formate, magnesium propionate, magnesium butyrate, magnesium citrate, magnesium lactate, and mixtures of any two or more thereof; and said clay is selected from the group consisting of kaolinite, halloysite, vermiculite, chlorite, attapulgite, smectite, montmorillonite, illite, saconite, sepiolite, palygorskite, Fuller's earth, and mixtures thereof and mixtures of any two or more thereof.

22. A process according to claim 21 wherein said viscosity promoter is selected from the group consisting of sodium aluminate, aluminum chloride, aluminum sulfate, aluminum acetate, iron chloride, iron sulfate, iron acetate, manganese chloride, manganese sulfate, manganese acetate, and mixtures of any two or more thereof.

23. A process according to claim 21 wherein said magnesium compound is selected from the group consisting of magnesium oxide, magnesium acetate, and mixtures of any two or more thereof.

24. A process according to claim 21 wherein the weight ratio of said viscosity promoter to said magnesium compound is in the range of from 1:9 to 1:1.

25. A process according to claim 21 wherein the weight % of said viscosity promoter and magnesium compound is in the range of from 0.025% to 1% based on total weight of the water-based fluid.

26. A process according to claim 21 wherein said clay is sodium montmorillonite (bentonite).

27. A process according to claim 21 wherein the weight percent of said clay is in the range of from about 0.25% to about 30% based on total weight of the water-based fluid.

28. A process according to claim 21 wherein the weight ratio of said viscosity promoter and magnesium compound to said clay is from about 1:8 to about 1:999.

29. A process comprising contacting a clay-containing, water-based fluid with a composition which consists essentially of (1) a viscosity promoter selected from the group consisting of sodium aluminate, aluminum chloride, aluminum sulfate, aluminum acetate, iron chloride, iron sulfate, iron acetate, manganese chloride, manganese sulfate, manganese acetate, and mixtures of any two or more thereof; and (2) a magnesium compound selected from the group consisting of magnesium oxide, magnesium hydroxide, magnesium acetate, and mixtures of any two or more thereof wherein the weight ratio of said viscosity promoter to said magnesium compound is in the range of from 1:9 to 1:1 and said water-based fluid comprises from 1 weight % to 20 weight % of bentonite.

* * * * *